United States Patent
Schmidt et al.

(10) Patent No.: US 6,840,993 B2
(45) Date of Patent: Jan. 11, 2005

(54) SILVER-COLORED LUSTER PIGMENT

(75) Inventors: Christoph Schmidt, Kriftel (DE);
Andrea Heyland, Reichelsheim (DE);
Claudia Fornoff, Otzberg (DE);
Hans-Dieter Brückner, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/419,172

(22) Filed: Apr. 21, 2003

(65) Prior Publication Data
US 2003/0205170 A1 Nov. 6, 2003

Related U.S. Application Data

(63) Continuation of application No. 10/003,118, filed on Dec. 6, 2001, now abandoned.

(30) Foreign Application Priority Data

Dec. 7, 2000 (DE) .......................................... 100 61 178

(51) Int. Cl.⁷ .............................................. C04B 14/20
(52) U.S. Cl. ....................... 106/417; 106/415; 106/417; 106/436; 106/442; 106/446
(58) Field of Search .................................. 106/415, 417, 106/436, 442, 446, 428

(56) References Cited

U.S. PATENT DOCUMENTS

| | | | |
|---|---|---|---|
| 3,087,828 A | | 4/1963 | Linton |
| 3,650,790 A | | 3/1972 | Klenke et al. |
| 4,038,099 A | | 7/1977 | DeLuca, Jr. et al. |
| 4,565,581 A | | 1/1986 | Bernhard |
| 4,879,140 A | | 11/1989 | Gray et al. |
| 5,091,011 A | | 2/1992 | DeLuca, Jr. |
| 5,607,504 A | | 3/1997 | Schmid et al. |
| 5,958,125 A | | 9/1999 | Schmid et al. |
| 5,993,526 A | | 11/1999 | Sommer et al. |
| 6,132,873 A | * | 10/2000 | Dietz et al. .................. 428/404 |
| 6,280,520 B1 | * | 8/2001 | Andes et al. ................ 106/415 |
| 6,284,032 B2 | * | 9/2001 | Andes et al. ................ 106/436 |
| 6,596,070 B1 | * | 7/2003 | Schmidt et al. ............. 106/417 |

FOREIGN PATENT DOCUMENTS

| | | | |
|---|---|---|---|
| DE | WO 99/20695 | * 4/1999 | ............. C09C/1/00 |
| EP | 370701 | 5/1990 | |
| EP | 708154 | 4/1996 | |
| EP | 803552 | 10/1997 | |
| WO | WO 98/12266 | 3/1998 | |

OTHER PUBLICATIONS

PAJ–JP 07246366A (Matsuda), Sep. 26, 1995.
PAJ–JP 02016168A (Kanebo Ltd.), Jan. 19, 1990.
PAJ–JP 06056628A (Pola Chem. Ind. Inc.), Mar. 1, 1994.
Chemical Abstracts, vol. 110, No. 20, May 15, 1989, Columbus, Ohio, Abstract No. 176060y, Tsugita, Akira et al., "Preparation of titania–alumina doubly coated mica powders and their optical properties", XP000056533 & Shikizai Kyokaishi, Bd. 61, Nr. 12, 1988, Japan, pp. 685–691.
English Abstract for EP 803552.

* cited by examiner

*Primary Examiner*—C. Melissa Koslow
*Assistant Examiner*—Shalie A Manlove
(74) *Attorney, Agent, or Firm*—Millen, White, Zelano & Branigan, P.C.

(57) ABSTRACT

The present invention relates to silver-colored luster pigments based on multiply coated platelet-shaped substrates, which has at least one layer sequence of $TiO_2$, a colorless coating and another $TiO_2$ layer. The pigment can optionally have an outer protective layer. These luster pigments are useful and to the use thereof in paints, coatings, printing inks, including security printing inks, plastics, ceramic materials, glasses, cosmetic formulations and for producing pigment preparations and dry product forms such as granules, chips, pellets and briquettes.

23 Claims, No Drawings

SILVER-COLORED LUSTER PIGMENT

This application is a Continuation of 10/003,118 filed Dec. 6, 2001, now abandoned.

The present invention relates to silver-colored luster pigments based on multiply coated platelet-shaped substrates.

Luster or effect pigments are widely used in industry, especially in automotive coatings, decorative coatings, plastic, paints, printing inks and cosmetic formulations.

Luster pigments with an angle-dependent color change between a number of interference colors exhibit a color interplay which makes them particularly useful for automotive coatings and anti-counterfeit applications.

The prior art discloses processes for preparing pearl luster pigments whereby alternating layers of high and low refractive index can be applied to finely divided substrates. Such pigments based on multiply coated platelet-shaped substrates are known for example from U.S. Pat. No. 4,434,010, JP H7-759, U.S. Pat. No. 3,438,796, U.S. Pat. No. 5,135,812, DE 44 05 494, DE 44 37 753, DE 195 16 181 and DE 195 15 988.

Of particular importance in this context are mineral-based pearl luster pigments. Pearl luster pigments are prepared by coating an inorganic platelet-shaped support with a high refractive, usually oxidic layer. The color of these pigments is caused by wavelength-selective partial reflection and interference of the reflected or transmitted light at the medium/oxide or oxide/substrate boundaries.

The interference color of these pigments is determined by the thickness of the oxide layer. The hue of an interference silver pigment is created by a single (in the optical sense) high refractive layer whose optical thickness gives rise to a reflection maximum (1st order) at about 500 nm in the visible wavelength range. The wavelength of about 500 nm is perceived by the human eye as the color green. However, the intensity curve of this maximum along its wavelength axis is so broad that so much light is reflected in the entire visible-light region that what the human eye sees is very bright but colorless.

One familiar with the optics of thin layers, particularly with the coating of optical components, would predict that the intensity at the interference maximum would increase by about 60% compared with the monolayer system. The profile of the light reflected by interference would accordingly become significantly more pronounced, so that such a multilayered system would be expected to have a green reflection color.

It has now been found that, surprisingly, an actual interference system in the form of alternating high refractive layers of $TiO_2$ and low refractive layers on a transparent substrate platelet is perceived not as green but as silvery at certain layer thicknesses.

The present invention accordingly provides silver-colored luster pigments based on multiply coated platelet-shaped substrates, comprising at least one layer sequence of (A) a high refractive coating consisting of $TiO_2$ and having a thickness of 5–200 nm, (B) a colorless coating having a refractive index $n \leq 1.8$ and a thickness of 10–300 nm, (C) a high refractive coating consisting of. $TiO_2$ and having a thickness of 5–200 nm, and optionally (D) an outer, protective layer.

The silver pigments according to the invention are superior to existing pearl luster pigments in the silver region because of a stronger, particularly metallic luster at steep viewing angles a higher transparency at flat viewing angles and a lighter masstone color.

The invention further provides for the use of the silver pigments according to the invention in paints, coatings, plastics, ceramic materials, glasses, cosmetic formulations, and especially in printing inks. The pigments according to the invention are also useful for preparing pigment formulations and also for preparing dry product forms, for example granules, chips, pellets, briquettes, etc. The dry product forms are useful for printing inks in particular.

Useful base substrates for the multilayer pigments according to the invention are selectively or nonselectively absorbing platelet-shaped substrates. Preferred substrates are sheet-silicates. Particularly useful are natural and/or synthetic mica, talc, kaolin, platelet-shaped iron or aluminium oxides, glass platelets, $SiO_2$ platelets, $Al_2O_3$ platelets, $TiO_2$ platelets, graphite platelets, synthetic support-free platelets, titanium nitride, titanium silicide, liquid crystal polymers (LCPs), holographic pigments, BiOCl, platelet-shaped mixed oxides, for example $FeTiO_3$, $Fe_2TiO_5$, or other comparable materials.

The size of the base substrates is not critical per se and can be adapted to the particular end use. In general, the platelet-shaped substrates are between 0.005 and 10 µm, preferably between 0.05 and 5 µm, in thickness. In the other two dimensions; i.e., in length and in width, the platelet-shaped substrates extend, independently in each of said other two dimensions, from 1 to 500 µm, preferably from 2 to 200 µm, and more preferably from 5 to 60 µm.

The thickness on the base substrate of the individual layers (A), (B) and (C) having a high refractive index or a low refractive index is important for the optical properties of the pigment. To obtain the silver pigment with an intensive luster effect, the thicknesses of the individual layers have to be precisely adjusted with respect to one another.

The thickness of the layer (A) or (C) is 5–200 nm, preferably 10–100 nm, and more preferably 20–70 nm. The $TiO_2$ layers (A) and (C) can have identical or different thicknesses. The thickness of layer (B) is 10–300 nm, preferably 20–100 nm, and more preferably 30–80 nm.

The pigments can contain a plurality of identical or different combinations of layer packets, but it is preferable to coat the substrate with only one layer packet (A)+(B)+(C)+optionally (D). To intensify the color strength, the pigment according to the invention can contain up to 4 layer packets, i.e., 1, 2, 3 or 4 packets. Layer sequences (A)+(B)+(C)+(B)+(C), (A)+(B)+(C)+(B)+(C)+(B)+(C) and (A)+(B)+(C)+(B)+(C)+(B)+(C)+(B)+(C) are possible. In this situation the thickness of all the layers on the substrate should preferably not exceed 3 µm. It is preferable to apply an odd number of layers to the platelet-shaped substrate with a high refractive layer both as the innermost and outermost layer. Preference is given to a construction of three optical interference layers in the sequence (A)(B) (C).

Colorless low refractive index materials useful as the coating (B) are preferably metal oxides or those corresponding oxyhydrates, for example $SiO_2$, $Al_2O_3$, AlO(OH), $B_2O_3$, $MgF_2$, $MgSiO_3$ or a mixture thereof. Layer (B) is preferably an $SiO_2$ layer.

The pigments according to the invention are easy to produce by generating a plurality of high and low refractive index interference layers having a precisely defined thickness and a smooth surface on the finely divided platelet-shaped substrates.

The metal oxide layers are preferably applied wet chemically, for example by using the wet-chemical coating processes developed for producing pearl luster pigments. Such processes are described for example in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or else in further patent documents and other publications known to one skilled in the art.

The substrate particles in a wet coating are suspended in water and admixed with one or more hydrolysable metal salts or a silicate solution at a suitable hydrolysis pH, chosen so that the metal oxides or oxyhydrates are directly precipitated onto the platelets without coprecipitations. The pH is customarily kept constant by simultaneous metered addition of a base and/or acid. The pigments are then separated off, washed and dried at 50–150° C. for 6–18 h and optionally calcined for 0.5–3 h, in which case the calcination temperature can be optimized with regard to the particular coating present. In general, the calcination temperatures are between 250 and 1,000° C., preferably between 350 and 900° C. If desired, the pigments can be separated off, dried and optionally calcined after application of individual coatings and then resuspended to precipitate further layers.

Furthermore, the coating may also be effected in a fluidized bed reactor by gas phase coating, in which case, for example, the processes proposed in EP 0 045 851 and EP 0 106 235 for producing pearl luster pigments can be employed with appropriate changes.

The hue of the pigments can be varied within very wide limits, subject to the silver effect obtained, by varying the coating rates and the resulting layer thicknesses. Beyond purely quantitative means, the fine adjustment for certain hues can be achieved by approaching the desired color under visual or instrumental control.

To increase light, water and weather stability, it is frequently advisable, depending on the field of use, to subject the ready-produced pigment to an aftercoating or aftertreatment. Useful aftercoatings or aftertreatments include for example the processes described in DE-C 22 15 191, DE-A 31 51 354, DE-A 32 35 017 or DE-A 33 34 598. The aftercoating layer (D) further enhances the chemical stability and/or facilitates the handling of the pigment, especially its incorporation into various media.

The pigments according to the invention are compatible with a multiplicity of color systems, preferably in the field of coatings, paints and printing inks. To produce printing inks, for example for intaglio printing, flexographic printing, offset printing, offset overprint coating, there are a multiplicity of suitable binders, especially water-soluble grades as sold for example by the companies BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks can be waterborne or solventborne. Furthermore, the pigments are also useful for the laser marking of paper and plastics and also for applications in the agricultural sector, for example, for greenhouse film, and also for the coloring of tarpaulins.

Since the silver pigments according to the invention combine superior luster with high transparency and a neutral masstone color, they can be used for obtaining particularly potent effects in various application media, for example, in cosmetic formulations, nail varnishes, lipsticks, compact powders, gels, lotions, soaps, toothpaste, coatings, automotive coatings, industrial coatings, powder coatings, in plastics, ceramics and, in the hobby sector, for window colors.

It should be readily understood that for various end uses, the multilayer pigments may also be used with advantage in blends with organic dyes, organic pigments or other pigments, for example transparent, hiding white, color and black pigments and also with platelet-shaped iron oxides, organic pigments, holographic pigments, LCPs (liquid crystal polymers), and conventional transparent, colored and black luster pigments based on metal oxide coated mica and $SiO_2$ platelets etc. The multilayer pigments can be blended with commercially available pigments and fillers in any proportion.

The pigments according to the invention are further useful for producing flowable pigment preparations and dry product forms, especially for printing inks, comprising one or more pigments according to the invention, binders and optionally one or more additives.

Suitable binders are those which are commonly added to paints and varnishes and are listed, for example, in Karsten, Lackrohstofftabellen, $8^{th}$ edition, 1987. Suitable binders are of those binders or binder mixtures that are customarily used for printing inks, examples being those based on cellulose, polyacrylate, polymethacrylate, alkyd, polyester, polyphenol, urea, melamine, polyterpene, polyvinyl, polyvinyl chloride and polyvinylpyrrolidone resins, polystryrenes, polyolefins, indene-coumarone, hydrocarbon, ketone, aldehyde and aromatic-formaldehyde resins, carbamic acid resins, sulfonamide resins and epoxy resins, polyurethanes and/or natural oils or derivatives of the substances mentioned.

Additives, for example, are pH regulators, defoamers, wetting agents, anti-settling agents, levelling agents, siccatives and thixotropic agents. These are auxiliaries customary in the coatings industry.

The invention thus also provides for the use of the pigments in formulations such as paints, printing inks, including security printing inks, coatings, plastics, ceramic materials, glasses and cosmetic formulations.

The examples hereinbelow will now describe the invention more particularly without, however, limiting it.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above or below, and of corresponding German application No. 10061178.8, filed Dec. 7, 2000, is hereby incorporated by reference.

EXAMPLES

Example 1

100 g of mica of particle size 10–60 μm in 2 l of demineralized water is heated to 75° C. On attainment of this temperature, a solution of 3 g of $SnCl_4 \times 5H_2O$ in 90 g of water is gradually added to the mica suspension while stirring. The pH is kept constant at 2.0 using 32% aqueous sodium hydroxide solution. The pH is then lowered to 1.8 and at this pH 270 g of 32% $TiCl_4$ solution is added in while the pH is kept constant using 32% aqueous sodium hydroxide solution. The pH is then raised to 7.5 and at this pH 270 g of sodium silicate solution (13.5% by weight of $SiO_2$) is gradually added in while the pH is kept constant at 7.5 using 10% HCl. Next, 300 g of 32% $TiCl_4$ solution is added at pH 1.8. After 0.5 h of stirring at pH 1.8, the coated mica pigment is filtered off, washed and dried at 110° C. for 16 h. Finally, the pigment is calcined at 800° C. for 1 h.

Example 2

100 g of mica of particle size 10–60 μm in 2 l of demineralized water is heated to 75° C. On attainment of this temperature, a solution of 3 g of $SnCl_4 \times 5H_2O$ in 90 g of water is gradually added to the mica suspension with vigorous stirring. The pH is kept constant at 2.0 using 32% aqueous sodium hydroxide solution. The pH is then lowered to 1.8 and at this pH 380 g of 32% $TiCl_4$ solution is added in while the pH is kept constant using 32% aqueous sodium hydroxide solution. The pH is then raised to 7.5 and at this pH 380 g of sodium silicate solution.(13.5% by weight of $SiO_2$) is gradually added in while the pH is kept constant at 7.5 using 10% HCl. Next, 380 g of 32% $TiCl_4$ solution is added at pH 1.8. After 0.5 h of stirring at pH 1.8, the coated mica pigment is filtered off, washed and dried at 110° C. for 16 h. Finally, the pigment is calcined at 800° C. for 1 h.

Example 3

100 g of mica of particle size 10–60 μm in 2 l of demineralized water is heated to 75° C. On attainment of this temperature, a solution of 3 g of $SnCl_4 \times 5H_2O$ in 90 g of water is gradually added to the mica suspension with vigorous stirring. The pH is kept constant at 2.0 using 32% aqueous sodium hydroxide solution. The pH is then lowered to 1.8 and at this pH 220 g of 32% $TiCl_4$ solution is added in while the pH is kept constant using 32% aqueous sodium hydroxide solution. The pH is then raised to 7.5 and at this pH 215 g of sodium silicate solution (13.5% by weight of $SiO_2$) is gradually added in while the pH is kept constant at 7.5 using 10% HCl. Next, 300 g of 32% $TiCl_4$ solution is added at pH 1.8. After 2.5 h of stirring at pH 1.8, the coated mica pigment is filtered off, washed and dried at 110° C. for 16 h. Finally, the pigment is calcined at 800° C. for 1 h.

Example 4

100 g of mica of particle size 10–60 μm in 2 l of demineralized water is heated to 75° C. On attainment of this temperature, a solution of 330 g of 32% $TiCl_4$ solution is added in while the pH is kept constant using 32% aqueous sodium hydroxide solution. The pH is then raised to 7.5 and at this pH 270 g of sodium silicate solution (13.5% by weight of $SiO_2$) is gradually added in while the pH is kept constant at 7.5 using 10% HCl. Next, 250 g of 32% $TiCl_4$ solution is added at pH 2.2. After 5 h of stirring at pH 2.2, the coated mica pigment is filtered off, washed and dried at 110° C. for 16 h. Finally, the silver pigment is calcined at 800° C. for 1 h.

The following table shows the calorimetric data of the pigments according to the invention in comparison with a silver pigment representing the prior art (Phyma-Lab values measured against black background with gloss 22.5°/22.5°):

| Pigment | L | a | b | C | Gloss number | Hiding power |
|---|---|---|---|---|---|---|
| Silver-colored pearl luster pigment Iriodin ® 103 (TiO₂ mica pigment of particle size 10–60 μm from Merck KGaA) | 83.6 | −1.4 | −1.9 | 2.4 | 58.5 | 30.6 |
| Silver pigment of Example 1 | 90.2 | −8.1 | −11.4 | 14.0 | 60.9 | 33.6 |
| Silver pigment of Example 2 | 93.0 | −5.5 | 13.0 | 14.1 | 61.3 | 37.0 |
| Silver pigment of Example 3 | 79.2 | −10.3 | −23.3 | 25.5 | 59.8 | 25.4 |
| Interference pigment of Example 4 | 84.5 | −8.1 | −10.5 | 13.3 | 61.4 | 27.2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A silver-colored luster pigment comprising a multiply coated transparent platelet-shaped substrate and at least one layer sequence of
    layer (A) a high refractive index coating consisting of $TiO_2$ which has a thickness of 5–200 nm,
    layer (B) a colorless coating having a refractive index $n \leq 1.8$ and a thicknes of 30–300 nm, and
    layer (C) a high refractive index coating consisting of $TiO_2$ which has a thickness of 5–200 nm,
    and optionally
    layer (D)an outer, protective layer, forming said silver-colored luster pigment, in such a manner to form a silver-colored luster pigment.

2. A luster pigment according to claim 1, wherein the platelet-shaped substrate is a sheet silicate.

3. A luster pigment according to claim 1, wherein the platelet-shaped substrate is a natural mica, a synthetic mica, talc, kaolin, a platelet-shaped iron oxide, a platelet-shaped aluminum oxide, a glass platelet, $SiO_2$ platelets, $TiO_2$ platelets, $Al_2O_3$ platelets, a synthetic support-free platelet, titanium nitride, titanium silicide, a holographic pigment, BiOCl, platelet-shaped mixed oxides of $FeTiO_3$ or $FeTiO_5$.

4. A luster pigment according to claim 1, wherein layer (B) comprises silicon dioxide, aluminum oxide, AlO(OH), $B_2O_3$, $MgSiO_3$, magnesium fluoride or mixtures thereof.

5. A luster pigment according to claim 1, wherein layer (B) comprises silicon dioxide.

6. A silver-colored luster pigment comprising a multiply coated transparent platelet-shaped substrate containing a layer sequence of(A)+(B)+(C)+(B)+(C), wherein
    layer (A) is a high refractive index coating consisting of $TiO_2$ which has thickness of 5–200 nm,
    layer (B)is a colorless coating having a refractive index $n \leq 1.8$ and a thickness of 30–300 nm, and
    layer (C) is a high refractive index coating consisting of $TiO_2$ which has thickness of 5–200 nm,
    and optionally layer (D) an outer, protective layer, forming said silver-colored luster pigment.

7. A silver-colored luster pigment comprising a multiply coated transparent platelet-shaped substrate containing a layer sequence of(A)+(B)+(C)+(B)+(C)+(B)+(C), wherein
    layer (A) is a high refractive index coating consisting of $TiO_2$ which has thickness of 5–200 nm, layer (B) is a colorless coating having a refractive index n≦1.8 and a thickness of 30–300 nm, and layer (C) is a high refractive index coating consisting of $TiO_2$ which has thickness of 5–200 nm, and optionally layer (D) an outer, protective layer, forming said silver-colored luster pigment.

8. A silver-colored luster pigment comprising a multiply coated transparent platelet-shaped substrate containing a layer sequence of (A)+(B)+(C)+(B)+(C)+(B)+(C)+(B)+(C), wherein layer (A) is a high refractive index coating consisting of $TiO_2$ which has a thickness of 5–200 nm, layer (B) is a colorless coating having a refractive index n≦1.8 and a thickness of 30–300 nm, and layer (C) is a high refractive index coating consisting of $TiO_2$ which has a thickness of 5–200 nm, and optionally layer (D) an outer, protective layer, forming said silver-colored luster pigment.

9. A luster pigment according to claim 1, wherein the platelet-shaped substrates are 0.005 to 10 µm in thickness, and 1 to 500 µm in length.

10. A luster pigment according to claim 9, wherein the platelet-shaped substrates are 0.5 to 5 µm in thickness, and independently of the thickness, 2 to 200 µm in length.

11. A luster pigment according to claim 9, wherein the platelet-shaped substrates are 5 to 60 µm in length.

12. A luster pigment according to claim 1, wherein layers (A) and (C) each independently of one another are 10 to 100 nm thick.

13. A luster pigment according to claim 1, wherein layers (A) and (C) each independently of one another are 20 to 70 nm thick.

14. A luster pigment according to claim 1, wherein layer (B) is 30 to 100 nm thick.

15. A luster pigment according to claim 1, wherein layer (B) is 30 to 80 nm thick.

16. A luster pigment according to claim 1, wherein the total thickness of all the layers on the substrate is at most 3 µm.

17. A luster pigment according to claim 8, wherein the total thickness of all the layers on the substrate is at most 3 µm.

18. A process for preparing a luster pigment of claim 1, wherein a substrate is coated wet chemically by hydrolytic decomposition of metal salts in an aqueous medium, or is gas phase coated in a fluidized bed reactor.

19. A method of coloring a paint, a coating, a painting ink, a security printing ink, a plastic, a ceramic material, glasses, a cosmetic formulation, a nail varnish, a lipstick, a compact powder, a gel, a lotion, a soap, a toothpaste, an automotive coating , an industrial coating, a powder coating, or a window by adding or applying a luster pigment of claim 1.

20. A pigment preparation comprising at least one luster pigment according to claim 1, at least one binder, and optionally at least one additive.

21. A pigment preparation according to claim 20 further comprising an organic dye, another pigment than a pigment according to claim 1, a liquid crystal polymer, a platelet-shaped iron oxide, a filler or mixtures thereof.

22. A paint, a coating, a painting ink, a security printing ink, a plastic, a ceramic material, glasses, a cosmetic formulation, a nail varnish, a lipstick, a compact powder, a gel, a lotion, a soap, a toothpaste, an automotive coating, an industrial coating, a powder coating, or a window colored by a pigment according to claim 1.

23. A silver-colored interference pigment with metallic luster comprising a multiply coated transparent platelet-shaped substrate and at least on layer sequence of layer (A) a high refractive index coating consisting of $TiO_2$ which has a thickness of 5–200 nm, layer (B) a colorless coating having a refractive index n≦1.8 and a thicknes of 30–300 nm, and layer (C) a high refractive index coating consisting of $TiO_2$ which has a thickness of 5–200 nm, and optionally layer (D)an outer, protective layer, forming said silver-colored interferenc pigment with a metallic luster; in such a manner to form a silver-colored luster pigment.

\* \* \* \* \*

UNITED STATES PATENT AND TRADEMARK OFFICE
CERTIFICATE OF CORRECTION

PATENT NO.    : 6,840,993 B2
DATED         : January 11, 2005
INVENTOR(S)   : Christoph Schmidt et al.

It is certified that error appears in the above-identified patent and that said Letters Patent is hereby corrected as shown below:

Column 6,
Line 30, reads "thicknes" should read -- thickness --
Line 53, reads "of(A)" should read -- off (A) --
Line 57, reads "(B)is" should read -- (B) is --
Line 65, reads "of(A)" should read -- of (A) --
Line 67, reads "has thickness" should read -- has a thickness --

Column 7,
Line 4, reads "has thickness" should read -- has a thickness --

Column 8,
Line 12, reads "coating ," should read -- coating, --
Line 26, reads "with metallic" should read -- with a metallic --
Line 28, reads "on" should read -- one --
Line 33, reads "thicknes" should read -- thickness --
Line 37, reads "interferenc" should read -- interference --
Line 37, reads "luster;" should read -- luster, --

Signed and Sealed this

Thirty-first Day of May, 2005

JON W. DUDAS
*Director of the United States Patent and Trademark Office*